June 19, 1951
C. H. HAMBLET ET AL
2,557,282
ADIPIC ACID PROCESS
Filed March 31, 1949
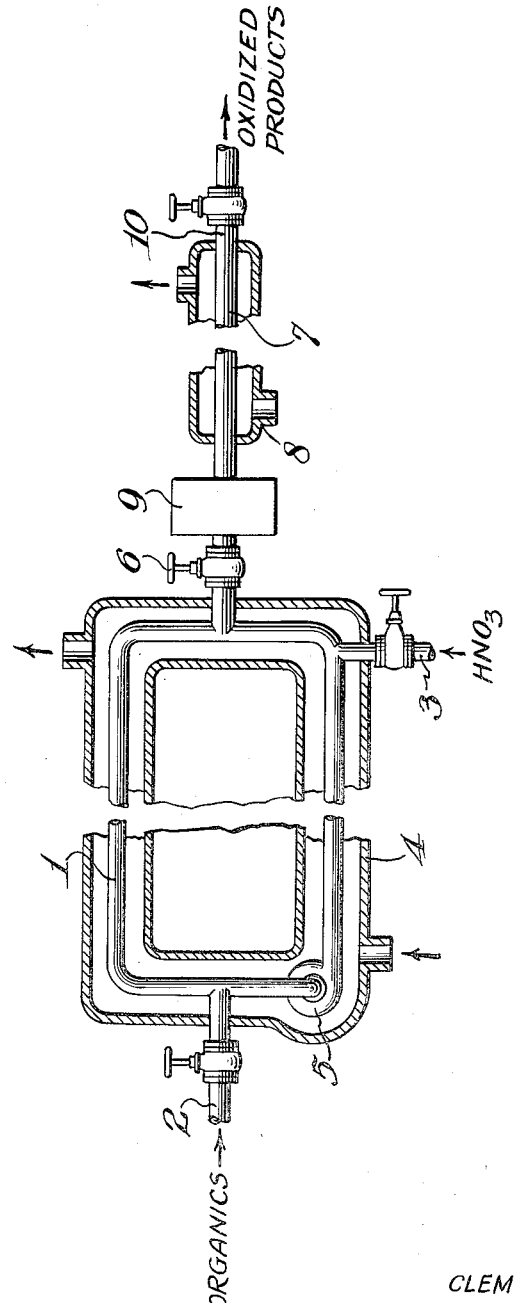
CLEMENT H. HAMBLET
and AMBROSE McALEVY
INVENTORS
BY 
ATTORNEY Patented June 19, 1951

2,557,282

UNITED STATES PATENT OFFICE 2,557,282

ADIPIC ACID PROCESS

Clement H. Hamblet and Ambrose McAlevy, Wilmington, Del., assignors to E. I. du Pont de Nemours & Company, Wilmington, Del., a corporation of Delaware Application March 31, 1949, Serial No. 84,512

9 Claims. (Cl. 260—533)

This invention relates to the production of adipic acid and related aliphatic dibasic acids and more particularly to the production of adipic acid by the oxidation of cyclohexane. This application is a continuation-in-part of U. S. application S. N. 789,924 filed December 7, 1947, now abandoned, which is a division of application S. N. 632,081, filed November 30, 1945, now U. S. Patent 2,439,513.

Production of pure dibasic acids by oxidation of cycloparaffins is of considerable commercial interest because of the increasing use of such acids in the manufacture of synthetic resins and the ready availability of the hydrocarbon starting materials from various sources. Direct oxidation of cyclanes, however, leads in general to a variety of products, from which separation of the derived acid in a reasonable state of purity is difficult and yields of any one acid are low. For example, in the oxidation of cyclohexane to adipic acid, yields in the range 18–24% have been reported (Markowinkoff, Ann. 302, I, 1898; Nameutkin, J. Ross, Phys. Chem. Soc. 40, 1570, 1908). Usually the reported yields have been much less, in the neighborhood of approximately 4%.

Overall yields of dibasic acids can be improved by carrying out the oxidation in a series of stages, in each of which the degree of oxidation of that portion of the charge which is attacked is controlled. Such oxidations as are described in the D. J. Loder Patents 2,223,493, and 2,223,494 wherein cyclohexane is oxidized to cyclohexanol and cyclohexanone might be considered as the preliminary step in such a process. When this oxidation is carried out at a temperature between 75 and 175° C. under 50 to 250 p. s. i. pressure, and with oxygen absorption limited to that corresponding to attack of 10% of the hydrocarbon charged, combined yields of cyclohexanol and cyclohexanone in the neighborhood of 70% may be obtained, the yields falling off as the attack on the hydrocarbon is increased. A very recent patent has issued in this field, namely, U. S. 2,452,741, which bears a filing date of March 28, 1947. This recent patent discloses a two-stage process in which the aqueous phase, which is formed in the Loder process, is separated and thereafter subjected to nitric acid oxidation. Our hereinbefore mentioned Patent 2,439,515 also discloses a two-stage process, in which the primary oxidation products obtained by Loder's process, are subjected to nitric acid oxidation after removal of the hydrocarbon.

To effect separation of the products from the mixture obtained in Loder's oxidation process, the unreacted cyclohexane may be first stripped from the crude reaction product by steam distillation under a fractionating column and recycled as feed to the preliminary oxidation step. In the Loder process, after removal of the hydrocarbon, cyclohexanol and cyclohexanone may be recovered as a mixture by further distillation with steam and separated by conventional vacuum fractionation techniques. The cyclohexanol may be further air oxidized to cyclohexanone and all of the cyclohexanone then air oxidized to adipic acid by known techniques.

Even when the previously known air oxidation steps (i. e. those which were known prior to the filing date of our parent application S. N. 632,081) were carried out under optimum known conditions, overall adipic acid yield based on the amount of cyclohexane consumed in the preliminary stage was far from theoretical and was usually in the neighborhood of 40%. Such processes suffer from the further disadvantage that extensive and expensive refining, accompanied by considerable handling losses, is required in the intermediate stages in order to give a final product of satisfactory purity.

This invention has as one of its objectives an improving process for converting cyclohexane to adipic acid. Another object is to provide a process for the preparation of adipic acid from cyclohexane whereby excellent yields of adipic acid of high purity are obtained. Another object is to provide an improved process for the production, from cyclic saturated hydrocarbons, of dibasic acids containing the same number of carbon atoms as the hydrocarbon treated, and more particularly to obtain adipic acid from cyclohexane by air oxidation of cyclohexane followed by nitric acid oxidation of the air oxidation product. A further object is to provide an improved technique for nitric acid oxidation of organic compounds. Other objects and advantages of the invention will hereinafter appear.

It has been found that a surprisingly better yield of adipic acid can be obtained from the cyclic hydrocarbon, e. g. cyclohexane, by the process of this invention than can be obtained from heretofore known processes. Generally, the process involves subjecting cyclohexane to air oxidation whereby a product containing a non-aqueous layer and an aqueous layer is formed, and thereafter subjecting all of the air oxidation products after the removal of the hydrocarbons to a nitric acid oxidation step. The products which are subjected to nitric acid oxidation includes all of the ingredients of the aqueous layer, and also the cyclohexanone and cyclohexanol which is present in the non-aqueous layer. In contradistinction to prior processes wherein cyclohexane was oxidized with air and the cyclohexanone and cyclohexanol separated prior to their oxidation, this process not only eliminates the step of separating the cyclohexanone and cyclohexanol from the reaction mixture but also without this separation produces more adipic acid than can be obtained by the former processes.

In accord with this invention it is also possible to oxidize, to aliphatic dibasic acids, other cyclic hydrocarbons such as cyclopentane, cyclobutane, and the like, aliphatic dibasic acids such as glutaric, succinic, and the like being produced. In these instances also the cyclic hydrocarbon is first preferably air oxidized, the unoxidized hydrocarbon removed and the mixture of products left, nitric acid oxidized. Although dibasic acids of a smaller number of carbon atoms than the hydrocarbon treated may be formed, the dibasic acids produced are predominantly of the same number of carbon atoms as the hydrocarbon oxidized.

One feature of the invention involves the nitric acid oxidation of the oxidized cyclic hydrocarbon product. Any suitable process for the oxidation of the cyclane may be employed such, for example, as the known liquid-phase air-oxidation process conducted at temperatures between 75 and 200° C. and under pressures from 50 to 500 p. s. i. in which process catalysts such as the metal salts of organic acids have been found useful and more particularly the cobalt naphthenates, cobalt stearates, chelate compounds of cobalt, chromium, manganese, vanadium, and the like. Compounds which from complexes with the heavy metals, e. g. aminocarboxylic acids, biacetyl, and polysaccharides may be used also. Other oxidation processes may also be employed such as, for example, those disclosed in the U. S. Patents 2,223,493 and 2,223,494. For example, one may employ, in addition to the metallic compound (e. g. a cobalt salt of an organic carboxylic acid), a free radical-producing substance as an initiator. Examples of such free radical producing substances are very numerous; they include benzoyl peroxide, acetyl peroxide, lauryl peroxide, diethyl peroxide, tertiary butyl peroxide, tertiary alkyl hydroperoxides, tertiary alkyl peresters, alkyl peresters of branched chain acids, diaryl peroxides, nitric oxide, azo compounds, hydrazines, nitroso compounds, hexaphenylethane, tetraphenylsuccinonitrile, etc.

While it is preferred to employ in this process the mixture of products obtained by the air oxidation of the cyclo-paraffins such as cyclohexane, nevertheless, any other suitable method for the oxidation of the cyclane may be employed although it has been found advisable that in oxidizing these cyclic hydrocarbons to products which are subsequent to be nitric acid oxidized to give organic acids, the oxidation of the cyclic hydrocarbon should result in what is called a partial oxidation in which from ½ to 2 moles of oxygen reacts per mole of the reacted cyclic hydrocarbon, and preferably from 0.75 to 1 mole of oxygen per mole of reacted cyclic hydrocarbon. It has been found that while improvements can be obtained in overall yield of dibasic acid, when the oxidation of the hydrocarbon falls outside these ranges, nevertheless, for optimum results it is recommended that the preliminary oxidation be conducted within these ranges. The reaction product which is formed by this preferred method contains a hydrocarbon phase, and an aqueous phase. The aqueous phase contains lactones and aliphatic acids including aliphatic hydroxy acids. The non-aqueous phase contains cyclic ketone, cyclic alcohol and cyclic hydrocarbon.

Prior to subjecting the products from the oxidation of cyclohexane or other cyclanes to nitric acid oxidation, it is desirable first to remove the hydrocarbons present and this may be accomplished by distillation although preferably steam distillation is employed to remove unreacted cyclohexane. The hydrocarbon may be recycled to the air or equivalent oxidation process. If desired live steam may be passed directly into the oxidation product and the hydrocarbon stripped from this product prior to the nitric acid oxidation of the product.

After removal of the unreacted hydrocarbon, all of the oxidation products, which include cyclohexanol and cyclohexanone as well as the ingredients of the aqueous layer, are subjected to further oxidation by means of nitric acid. Separation of the said aqueous layer from the mixture prior to steam distillation is permissible but unnecessary, since steam distillation is an efficient method for separating the unreacted hydrocarbon from the material which is to undergo further oxidation.

Although the art of oxidizing organic compounds by means of nitric acid has long been practiced, disclosures in general show yields which are far from ideal and give products of questionable purity. For example, in the laboratory technique for preparing adipic acid by oxidation of cyclohexanol described in Organic Syntheses (Gilman, Coll. vol. I, p. 18 (1932)) a yield of only 58–60% of crude acid melting at 141–149° C. is reported. In addition to giving impure acid such oxidations are excessively costly unless some means of recovery and reuse of nitric acid is devised; because of the highly corrosive nature of the mixture a practical method for achieving this has long been sought. Furthermore, because of the large amount of heat evolved in such oxidations, temperature control, which is necessary for obtaining optimum yields, is difficult in commercial installations, a factor which greatly restricts the unit scale on which such reactions can be performed. In the case of adipic acid preparation, removal of heat by conventional methods such as cooling surfaces is also seriously handicapped by crystallization of the product on the cooling surfaces. All of these disadvantages are overcome by another feature of the invention.

This feature involves the nitric acid oxidation of the product, obtained after removing the cyclane from the preliminary oxidation products, which is effected by subjecting such a product to nitric acid oxidation under pressures above atmospheric and in the presence of a suitable catalyst. The oxidation with nitric acid may be effected in a single stage but is preferably effected in two stages.

If the single stage nitric acid oxidation is employed, the reaction is effected at a temperature between 30 and 150° C. and under a pressure above atmospheric preferably between 15 and 500 p. s. i. While oxidation in accord with the single step nitric acid procedure will give yields superior to those heretofore obtainable; nevertheless, its superiority over heretofore known processes can be augmented by conducting this phase of the process in two stages.

In the preferred two-stage process, the first stage is carried out under mild conditions in which the reactants flow around a closed circuit; and in the second stage, the products from the first or circulating stage are further oxidized at a somewhat higher temperature. This feature of the invention has solved for the first time the problems presented by nitric-acid oxidation of organic compounds generally and particularly the nitric-acid oxidation of cyclane oxidation products by way of a continuous process in contradistinction to a batch process.

A preferred method of operating the nitric-acid oxidation step is illustrated in the accompanying drawing, which is a diagrammatic cross-sectional plane view of a tubular converter.

The jacketed tube 1 is of considerable length and formed as shown in the drawing in a rectangular shape although it may be constructed in any desired shape with inlets 2 and 3 for the introduction of the reactants. Tube 1 is surrounded by jacket 4 through which circulates a heat-exchange fluid for controlling the reaction in the desired temperature range. A pump 5 is provided in tube 1 for maintaining a flow of reactants through this tube. An automatically controlled valve 6 operates to deliver products from tube 1 through preheater 9 into a second reaction zone provided by tube 7 which is surrounded by a jacket 8 for controlling this phase of the reaction in the desired temperature range. The process may be carried out in this apparatus by first introducing nitric acid and catalyst into tube 1 through inlet 3 and forcing it around through the tube by means of pump 5. The mixure of products from air oxidation of the cyclane is then introduced through 2 and the flow of heat exchange fluid in the jacket 4 regulated to maintain the temperature of the reaction within the designated range. When the reaction has proceeded for an average of from 1 to 10 minutes the valve 6 is brought into operation and a part of the stream of reactants passing through tube 1 is introduced into preheater 9 and reaction tube 7 wherein its temperature is raised and the oxidation completed. The oxidation products issue from the reactor through the outlet 10.

The essential features of the two-stage continuous nitric-acid oxidation step are: The cyclane-free product of the preliminary oxidation and a nitric acid solution of 30–70% strength, preferably 50–60% strength, based on volatile content, containing a suitable catalyst are separately and continuously introduced under a pressure of 2–10 atm. into the rapidly flowing stream containing nitric acid, catalyst, water, and products of the reaction in tube 1. The weight ratio of flows of the nitric acid mixture to organic feed added to the circulating mixture should be in the range of 5–40, preferably 15–25, at the point of mixture; weight ratios of 100% nitric acid in the feed to organics feed should be in the range 2.5–6.0. Pump 5 recirculates the nitric acid mixture through the tubular system, the rate of recirculation being such that the fluid flow is in the turbulent range. The temperature of the recirculating mixture should be maintained between 40–90° C., preferably between 60–80° C. by means of suitable jacket coolants. Gases formed in the oxidation are preferably separated at some point in the recirculation system, as for example, a pipe (not shown in the drawing) vertically positioned on tube 1. The rate of admittance of organic feed to the recirculation system should be such that the average contact time in this part of the equipment is of the order of 1–10 minutes, preferably about 5 minutes.

Although various types of catalysts may be used, those preferred are mixtures containing dissolved copper salts and dissolved vanadium or manganese salts, total concentration of catalyst being in the range 0.01–0.5 weight percent based on the nitric acid solution being fed. The vanadium catalyst may be obtained in soluble form by, e. g. treatment of an aqueous or nitric acid suspension of vanadium pentoxide with nitrogen dioxide, nitric oxide, or nitrogen trioxide or gaseous mixtures containing one or more of these nitrogen oxides. The use of a copper promoter for the vanadium catalyst is highly effective. The following table illustrates the improved results which are achieved through the use of these catalysts:

*Table*

| Catalyst | Yield |
| --- | --- |
| (Per cent based on HNO$_3$ solution) | # HOAd/# feed |
| None | 0.631, 0.637 |
| 0.05% NH$_4$VO$_3$ | 0.760, 0.792 |
| Do | 0.882, 0.920 |
| 0.05% NH$_4$VO$_3$+0.15% Dissolved Cu | 1.003, 1.017 |
| 0.05% NH$_4$VO$_3$+0.15% Cu added as cupric nitrate | 0.999 |
| 0.05% NH$_4$VO$_3$+0.15% Cu added as cuprous oxide | 1.007 |

The oxidation mixture is continuously withdrawn from the circulating stage, the rate of withdrawal bearing such a relation to the rate of feeding that the volume of liquid mixture in the circulating system remains substantially constant. The effluent is then conducted to the second nitric acid oxidizing reaction, preferably after being preheated. The mixture is held during this phase of the reaction (which may be conducted in a tubular unit as illustrated in the drawing or an autoclave) at a higher temperature between 90–120° C. and preferably between 95–100° C., for an average period of 3–20 minutes, preferably about 7 min. The reaction is exothermic and the mixture should be cooled to maintain the temperature within the designated range.

The reacted mixture issuing from the second stage reaction may be bleached by countercurrent treatment with air at a temperature between 70 and 100° C. and preferably at about 90° C. The off-gas from the bleaching operation contains nitrogen oxides which may be recovered as nitric acid by absorption in water or nitric acid solution by known methods. The air flow to the bleaching operation should consequently be at least great enough to provide sufficient oxygen for complete oxidation of the nitrogen oxides to nitric acid. Monobasic acids are formed in the oxidation of many cyclanes. In the case where products from air oxidation of cyclohexane are converted to adipic acid by nitric acid treatment, the presence of n-valeric and n-caproic acids in particular, make the recovery of high quality adipic acid difficult and these and similar acids should be removed by fractional distillation prior to the crystallization of the adipic acid.

The dibasic acid is crystallized from the monobasic acid-free product by cooling to a suitably low temperature. In the case of adipic acid crystallization, the preferred temperature is in the vicinity of 5° C. The crude acid may be recovered from the slurry by known techniques such as filtration or centrifuging, and the mother liquor is vacuum flash distilled under pressures in the range 30–300 mm. and at temperatures in the range 50–150° C., the distillate being preferably recycled with the remainder of the mother liquor. A similar recovery method has been very recently disclosed in French Patent 899,847.

In cases where vanadium compounds are used in the catalyst mixture, this element may be recovered from the tails from the flash distillation of the mother liquor by diluting to give a solution which is homogeneous at room temperature and adjusting the pH of the solution to a value in excess of 1.0 by addition of an inorganic base such as sodium carbonate or hydroxide. Under these conditions the vanadium has been found to practically quantitatively precipitated in the form of an organic complex. The latter may be recovered by filtration and recycled to the nitric acid oxidation step.

The following examples will illustrate preferred embodiments of the invention in which parts are by weight unless otherwise stated.

*Example 1.—Cyclohexane-air oxidation to alcohol and ketone, separately oxidizing the alcohol to ketone and oxidizing the ketone to adipic acid*

A charge containing 1997.1 parts of cyclohexane, 6.0 parts of cyclohexanone and 1.2 parts of cobalt naphthenate was air oxidized in a one gallon stainless steel autoclave operated at 142–145° C. under 100 p. s. i. pressure for 77 minutes at an air space velocity of 91 volumes (S. T. P.) per volume of charge per hour. The product was then discharged and unreacted hydrocarbon was recovered by steam distillation under a fractionating column operating at atmospheric pressure. Unreacted hydrocarbon, recovered as the water azeotrope boiling in the range 68–80° C. amounted to 1748.8 parts, corresponding to a consumption of 248.3 parts or 12.5% during oxidation.

Exhaustive steam distillation of the residue from the above distillation gave 233.2 parts of oil boiling azeotropically with water in the range 93–100° C. By vacuum fractionation of the oil, after drying, 86.2 parts of cyclohexanone and 84.4 parts of cyclohexanol were recovered, corresponding to a net combined yield of 56.3% based on cyclohexane consumption.

The cyclohexanol was converted to cyclohexanone and all of the cyclohexanone was then converted to adipic acid by air oxidation, according to known techniques. In a large number of tests adipic acid yield based on cyclohexanone and cyclohexanol was invariably less than 176 parts or 70%, corresponding to an overall adipic acid yield of less than 0.71 parts of adipic acid per part of cyclohexane consumed.

*Example 2.—Oxidation of cyclohexane followed by nitric acid oxidation of the oxidized product*

A similar cyclohexane oxidation product after stripping of the unconverted cyclohexane and partially drying but without removing any cyclohexanone or cyclohexanol was found by analysis to contain 28.4% cyclohexanone, 29.6% cyclohexanol, 0.6% cyclohexenyl cyclohexyl ether, 3.2 cyclohexyl esters, some cyclohexanediol-1,2, and 22.2% of material which was not volatile with steam. The non-volatile fraction was found to contain adipate esters, δ-formyl valeric acid, ε-hydroxy caproic acid and its esters, along with lower homologues.

506.3 parts of this mixture was added gradually over a period of 120 minutes, to a mixture containing 1490 parts of nitric acid, 1010 parts of water, 1.25 parts of ammonium metavanadate and 3.75 parts of freshly dissolved copper, said mixture being maintained at 60° C. in a stirred stainless steel autoclave. The mixture was then heated to 110–114° C. for a period of 60 minutes and discharged from the autoclave. After crystallizing at 5° C. and centrifuging, 473.4 parts of wet crude adipic acid containing 445.7 parts of 100% adipic acid were recovered. An additional 20.9 parts of 100% adipic acid was shown to be recoverable from the converter wash and mother liquor, giving a total yield of 466.6 parts of adipic acid or a superficial yield of 108% based on the cyclohexanone and cyclohexanol content of the charge, corresponding to an overall yield of 1.06 parts of adipic acid per part of cyclohexane consumed.

These examples show that in the nitric acid oxidation of products obtained by air oxidation of cyclohexane yield was not only greater but was in excess of that which can theoretically be obtained by separate air oxidation of the cyclohexanone and cyclohexanol formed in the preliminary air oxidation.

By substituting other cyclanes for cyclohexane, other dibasic acids may be obtained in acceptable yields from cyclopentane-glutaric, cyclobutane-succinic and from higher cyclanes correspondingly higher dibasic acids.

*Example 2a.—Vapor phase oxidation of cyclohexane followed by nitric acid oxidation of the oxidized product*

Cyclohexane vapors and air in the ratio 1:5 by volume are preheated to 300° C. and passed over a silver oxide catalyst maintained at a temperature between 400 and 450° C. The catalyst may be supported on asbestos or any other suitable support and the cyclohexane passed over the catalyst at a space velocity sufficient to give a contact time of approximately 0.3 seconds. The effluents were cooled, the unconverted cyclohexane removed by distillation and the residue subjected to nitric acid oxidation by a process similar to that described in Example 2. A better yield of adipic acid is obtainable by this method than is obtainable by a separation of the cyclohexanone and cyclohexanol from the oxidized cyclohexane and subjecting these alcohols and ketones to a separate oxidation.

*Example 3.—Oxidation mixture of cyclohexyl valerate and cyclohexanol*

297.8 parts of cyclohexyl valerate were similarly oxidized by nitric acid in a stirred autoclave. Adipic acid formed amounted to 179.3 parts, corresponding to a yield of 75.8%. Similarly 487.5 parts of cyclohexanol gave 655.4 parts of adipic acid, corresponding to a yield of 92.0%. When a mixture containing 241.5 parts of cyclohexyl valerate and 241.5 parts of cyclohexanol was similarly oxidized, however, an overall yield improvement was noted, 489.5 parts of adipic acid, corresponding to an average yield of 90.0%, being obtained. If, for example, the yield from cyclohexanol be assumed to be that found in oxidation of cyclohexanol alone, 92.0%, net yield of adipic acid obtained from cyclohexyl valerate was raised from 75.8% to 86.1% as a result of oxidizing these materials simultaneously.

*Example 4.—Nitric acid oxidation at two temperature levels*

Mixtures containing 50% cyclohexanol and 50% cyclohexanone were passed with approximately 7 parts of 60% nitric acid containing 0.05% ammonium vanadate catalysts through a jacketed tubular converter similar to that illustrated by the drawing maintained at 71–76° C. at such rates that the total contact time varied in the range 8.5–17.6 minutes. At the different rates of flow, yield of adipic acid did not vary outside the range 67.1–70.6%. Furthermore, by changing the temperature in the range 71–125° C., yield did not vary outside the range 64.3–71.5%. By varying the temperature during passage through the tubular unit, however, considerable improvement in yield was noted. Thus, when the first 46% of the volume of the converter was maintained at 60° C. and the remainder was maintained at 100° C. at total contact times in the range 11.0–11.7 minutes, adipic acid yields in the range of 78.3–78.6% were obtained.

*Example 5.—Nitric acid oxidation with recirculatory system*

In a series of reactions one part of cyclohexane air-oxidation products, less rich in products oxidizable to the oils that are oxidizable to adipic acid than the air oxidized product of Example 2, were fed with 9 parts of 50% nitric acid containing 0.05 ammonium vanadate and 0.15% dissolved copper into a tubular unit operated under 30 p. s. i. at such a rate that contact time in the first section which was maintained at 60° C. was about 1 minute while the contact time in the second section which was maintained at 100° C. was about 9 minutes. Average yield in 14 such tests was 0.877 part of adipic acid per part of organic feed.

In a similar series of reactions the same organics to nitric acid ratio and catalyst concentration were maintained but the nitric acid feed and organic feed were introduced into the 60° C. section at different points and the reaction mixture was recirculated in the 60° C. reaction at a rate which was 5–7 times greater than the total feed rate. Adipic acid yield was appreciably improved amounting to 0.929 part per part of organic feed.

The crude reaction mixture obtained from the second nitric acid oxidation stage, i. e., from the higher temperature reaction of Examples 4 and 5, contains appreciable quantities of nitric acid and it likewise contains along with the adipic acid, monobasic acids in amounts ranging from 0.4 to about 1% based on the crude reaction mixture. The monobasic acid contaminants must be removed if a pure acid is desired and various methods have been tried from attaining this result. For example, the monobasic acids may be removed from the crude reaction mixture by subjecting it to steam distillation. By this method a clean separation is possible. Inasmuch as, however, there are appreciable quantities of nitric acid in the crude mixture, appreciable amounts of this acid are distilled over with the monobasic acid and are recovered only with difficulty from the dilute distillate. This method of purification is quite expensive and does not separate monobasic acids from all of the nitric acid.

It has been found that the nitric acid can be recovered without unconscionable losses if the crude reaction mixture is introduced into a midsection of a distillation column. The vapors resulting from boiling the tails from those portions of the reaction mixture that descend the column are introduced into the bottom of the column and water is introduced into the top of the column. By operating in this manner, only inappreciable amounts of nitric acid distill over with the monobasic acids. Moreover, adipic acid can be crystallized from the tails of the column free from substantial impurities of the monobasic acid, and from the mother liquor the nitric acid can be easily recovered. Example 6 illustrates this feature of the invention.

*Example 6.*—360.5 parts of the same crude mixture were fed to the center of a distilling column which it descended countercurrent to 240 parts of its own tails vapor. Simultaneously 160 parts of distilled water were fed, to the top of the column. The distillate contained only 0.2% nitric acid, and adipic acid crystallized from the tails contained only 0.07% monobasic organic acids calculated as valeric.

The example given below illustrates a preferred method of purifying the reaction mixture to recover adipic acid free from monobasic acids and to recover appreciable quantities of the nitric acid used.

*Example 7.*—When the nitric acid oxidation of cyclohexane oxidation products was carried out as described in Example 2 and the crude product was concentrated in a column with water reflux as described in Example 6, the crude adipic acid, after drying, melted at 151.5–151.9° C. and had a purity of 98.9±0.4% in a large number of batches. Recrystallization from water gave refined acid which after drying melted at 151.9–152.1° C. and had a purity of 99.9±0.05%. Cf. Gilman's product supra.

We claim:

1. In a process for the preparation of adipic acid from cyclohexane, the steps which comprise oxidizing cyclohexane with air at a temperature between 50° and 175° C. and under a pressure between 50 and 250 p. s. i. until from 0.5 to 2 moles of oxygen react per mole of cyclohexane attacked, separating the unoxidized cyclohexane from the reaction mixture and nitric acid oxidizing the cyclohexane-free reaction product under two temperature stages by conducting a stream of the cyclohexane-free reaction product as a feed and a stream of nitric acid into a rapidly moving stream, flowing in a closed circuit, containing nitric acid, catalyst, water and partially nitric acid oxidized feed, maintained at a temperature between 40° and 90° C., withdrawing a portion of the partially nitric acid oxidized feed and heating it in a second stage at a higher temperature.

2. The process of claim 1 in which the second stage nitric acid oxidation is conducted at a temperature above 90° and up to 120° C.

3. The process of claim 1 in which the first nitric acid oxidation stage is conducted at a temperature between 60° and 80° C., and the second nitric acid oxidation stage is conducted at a temperature between 95° and 100° C.

4. In a process for the preparation of adipic acid from cyclohexane, the steps which comprise oxidizing cyclohexane with air at a temperature between 50° and 175° C. and under a pressure between 50 and 250 p. s. i. until from 0.5 to 2 moles of oxygen react per mole of cyclohexane attacked, separating the unoxidized cyclohexane from the reaction mixture and nitric acid oxidizing the cyclohexane-free reaction product under two temperature stages, by conducting a stream of the cyclohexane-free reaction product as a feed and a separate stream of nitric acid into a rapidly moving turbulent stream, flowing in a closed circuit, containing nitric acid, catalyst, water and partially nitric acid oxidized feed maintained at a pressure between 2 and 10 atmospheres, and at a temperature between 40 and 90° C., withdrawing a portion of the partially nitric acid oxidized feed and heating it in a second stage at a higher temperature.

5. In a process for the preparation of adipic acid from cyclohexane, the steps which comprise oxidizing cyclohexane with air at a temperature between 50° and 175° C. and under a pressure between 50 and 250 p. s. i. until from 0.5 to 2 moles of oxygen react per mole of cyclohexane attacked, separating the unoxidized cyclohexane from the reaction mixture and nitric acid oxidizing the cyclohexane-free reaction product under two temperature stages, by conducting the cyclohexane-free reaction product as a feed into a rapidly moving turbulent stream, flowing in a closed circuit, containing nitric acid, catalyst, water and partially nitric acid oxidized feed, the weight ratio of nitric acid to feed in the range of 5-40 at the point of mixture, maintained at a pressure between 2 and 10 atmospheres, and at a temperature between 40 and 90° C., withdrawing a portion of the partially nitric acid oxidized feed and heating it in a second stage at a temperature above 90° C. and up to 120° C.

6. In a process for the preparation of adipic acid from cyclohexane, the steps which comprise oxidizing cyclohexane with air at a temperature between 50° and 175° C. and under a pressure between 50 and 250 p. s. i. until from 0.5 to 2 moles of oxygen react per mole of cyclohexane attacked, separating the unoxidized cyclohexane from the reaction mixture and nitric acid oxidizing the cyclohexane-free reaction product under two temperature stages, by conducting the cyclohexane-free reaction product as a feed into a rapidly moving turbulent stream, flowing in a closed circuit, containing nitric acid, a catalyst of the group consisting of vanadium and manganese in solution, water and partially nitric acid oxidized feed, the weight ratio of nitric acid to feed being in the range of 15-25 at the point of mixture, maintained at a pressure between 2 and 10 atmospheres and at a temperature between 40 and 90° C., withdrawing a portion of the partially nitric acid oxidized feed at a rate bearing such a relation to the rate of feeding that the volume of liquid mixture in the closed circuit remains substantially constant, and heating the withdrawn product in a second stage at a higher temperature.

7. In a process for the nitric acid oxidation of a liquefied organic compound involving highly exothermic reactions, the steps which comprise effecting the oxidation with nitric acid in at least two stages, in one stage by passing a stream of the liquefied organic compound as a feed and a separate stream of nitric acid into a rapidly moving turbulent stream, flowing in a closed circuit, containing nitric acid, water and partly nitric acid oxidized feed, maintained at an oxidation temperature, withdrawing a portion of the partly nitric acid oxidized feed at a rate bearing such a relation to the rate of feeding that the volume of liquid mixture in the closed circuit remains substantially constant and heating the withdrawn feed in a second stage at a higher oxidation temperature.

8. In a process for the nitric acid oxidation of a liquefied organic compound involving highly exothermic reactions, the steps which comprise effecting the oxidation with nitric acid in at least two stages, in one stage by passing a stream of the liquefied organic compound as a feed and a separate stream of nitric acid into a rapidly moving and externally cooled turbulent stream, flowing in a closed circuit, containing nitric acid, water and partly nitric acid oxidized feed, maintained at an oxidation temperature, withdrawing a portion of the partly nitric acid oxidized feed at a rate bearing such a relation to the rate of feeding that the volume of liquid mixture in the closed circuit remains substantially constant and heating the withdrawn feed in a second stage at a higher oxidation temperature.

9. A process for the production of dibasic aliphatic acids which comprises oxidizing a cycloparaffin with gaseous oxygen at a temperature between 50° and 175° C. and under a pressure between 50 and 250 p. s. i. until from 0.5 to 2 moles of oxygen react per mole of the cycloparaffin attacked, removing the unreacted cycloparaffin from the mixture by steam distillation thereof and, in two temperature stages, further nitric acid oxidizing the oxidizable ingredients of the resultant residue comprising the said cyclic alcohols, cyclic ketones, aliphatic hydroxy acids and lactones, at a temperature between 40° and 120° C., the reaction being conducted in a continuous manner whereby the cycloparaffin is continuously introduced into the air oxidation reaction and a dibasic aliphatic acid continuously removed from the nitric acid oxidation.

CLEMENT H. HAMBLET.
AMBROSE McALEVY.

REFERENCES CITED

The following references are of record in the file of this patent:

UNITED STATES PATENTS

| Number | Name | Date |
|---|---|---|
| 2,380,196 | Soltzberg | July 10, 1945 |
| 2,439,513 | Hamblet et al. | Apr. 13, 1948 |
| 2,452,741 | Fleming | Nov. 2, 1948 |